US010705532B2

(12) United States Patent
Holmberg

(10) Patent No.: US 10,705,532 B2
(45) Date of Patent: Jul. 7, 2020

(54) STANDING TEST DEVICE FOR MOBILE ROBOTS

(71) Applicant: X Development LLC, Mountain View, CA (US)

(72) Inventor: Robert Holmberg, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 371 days.

(21) Appl. No.: 15/854,376

(22) Filed: Dec. 26, 2017

(65) Prior Publication Data

US 2019/0196488 A1  Jun. 27, 2019

(51) Int. Cl.
*G05D 1/02* (2020.01)
(52) U.S. Cl.
CPC ......... *G05D 1/0225* (2013.01); *G05D 1/0287* (2013.01); *G05D 2201/0216* (2013.01)
(58) Field of Classification Search
CPC .............. G05D 1/0225; G05D 1/0287; G05D 2201/0216
See application file for complete search history.

(56) References Cited

U.S. PATENT DOCUMENTS

| | | | | | |
|---|---|---|---|---|---|
| 5,767,793 | A * | 6/1998 | Agravante | ........... | H01Q 1/3233 340/903 |
| 6,252,240 | B1 * | 6/2001 | Gillis | ................. | G01G 19/4142 250/221 |
| 6,678,582 | B2 * | 1/2004 | Waled | ...................... | B25J 9/161 318/568.11 |
| 8,800,101 | B2 * | 8/2014 | Kim | ....................... | A47L 9/2805 15/319 |
| 9,636,992 | B2 * | 5/2017 | Biderman | ........... | B60R 25/1003 |
| 9,636,993 | B2 * | 5/2017 | Biderman | ............ | A61B 5/6893 |
| 9,669,699 | B2 * | 6/2017 | Biderman | ............... | E05B 81/54 |
| 9,669,700 | B2 * | 6/2017 | Biderman | .......... | A63B 24/0062 |
| 9,701,190 | B2 * | 7/2017 | Biderman | .......... | G01C 21/3632 |
| 9,738,151 | B2 * | 8/2017 | Biderman | ............... | B60L 15/20 |
| 9,815,363 | B2 * | 11/2017 | Biderman | ............... | B60L 58/10 |
| 9,878,608 | B2 * | 1/2018 | Biderman | ............ | A61B 5/0002 |
| 9,902,252 | B2 * | 2/2018 | Biderman | ............ | B60Q 5/005 |
| 9,931,924 | B2 * | 4/2018 | Biderman | ............... | B60L 58/12 |
| 9,937,783 | B2 * | 4/2018 | Biderman | .......... | A63B 24/0087 |
| 9,944,167 | B2 * | 4/2018 | Biderman | ............. | A63B 21/22 |
| 10,106,026 | B2 * | 10/2018 | Biderman | .......... | G01C 21/3664 |
| 10,166,856 | B2 * | 1/2019 | Biderman | ............ | A61B 5/0002 |
| 10,259,311 | B2 * | 4/2019 | Biderman | ............. | G08G 1/052 |

(Continued)

*Primary Examiner* — Frederick M Brushaber
(74) *Attorney, Agent, or Firm* — McDonnell Boehnen Hulbert & Berghoff LLP

(57) ABSTRACT

Embodiments are provided that include a method that includes causing a mobile robot to navigate toward a standing test device placed within an environment of the mobile robot. The method also includes receiving, from a proximity sensor on the standing test device, sensor data indicative of proximity of the mobile robot to the standing test device as the mobile robot navigates toward the standing test device. The method further includes determining, based on the sensor data received from the proximity sensor on the standing test device, an approach motion profile followed by the mobile robot in navigating toward the standing device. The method additionally includes providing a control instruction for the mobile robot based on the determined approach motion profile.

20 Claims, 9 Drawing Sheets

(56) References Cited

U.S. PATENT DOCUMENTS

| | | | | |
|---|---|---|---|---|
| 10,543,741 B2* | 1/2020 | Biderman | | G06F 8/65 |
| 2005/0041529 A1* | 2/2005 | Schliep | | G01S 7/539 |
| | | | | 367/99 |
| 2005/0177336 A1* | 8/2005 | Zimmermann | | G01S 7/412 |
| | | | | 702/150 |
| 2010/0097200 A1* | 4/2010 | Hilsebecher | | G01S 7/412 |
| | | | | 340/436 |
| 2013/0268184 A1* | 10/2013 | Zagorski | | G08G 1/166 |
| | | | | 701/300 |
| 2015/0009062 A1* | 1/2015 | Herthan | | E05B 83/16 |
| | | | | 342/70 |
| 2015/0183410 A1* | 7/2015 | Ko | | B60T 8/174 |
| | | | | 701/96 |
| 2016/0009169 A1* | 1/2016 | Biderman | | A63B 24/0084 |
| | | | | 701/22 |
| 2016/0009179 A1* | 1/2016 | Biderman | | A61G 5/04 |
| | | | | 701/22 |
| 2016/0009181 A1* | 1/2016 | Biderman | | A61B 5/11 |
| | | | | 701/22 |
| 2016/0009223 A1* | 1/2016 | Biderman | | B60R 25/1003 |
| | | | | 701/22 |
| 2016/0009293 A1* | 1/2016 | Biderman | | B60L 50/20 |
| | | | | 701/22 |
| 2016/0009334 A1* | 1/2016 | Biderman | | B60R 25/20 |
| | | | | 701/2 |
| 2016/0009335 A1* | 1/2016 | Biderman | | A63B 24/0087 |
| | | | | 701/22 |
| 2016/0009336 A1* | 1/2016 | Biderman | | B60L 58/12 |
| | | | | 701/22 |
| 2016/0009337 A1* | 1/2016 | Biderman | | B60K 7/00 |
| | | | | 701/2 |
| 2016/0009338 A1* | 1/2016 | Biderman | | A61B 5/7282 |
| | | | | 701/22 |
| 2016/0009339 A1* | 1/2016 | Biderman | | A63B 21/0058 |
| | | | | 701/22 |
| 2016/0011003 A1* | 1/2016 | Biderman | | B60K 7/0007 |
| | | | | 701/538 |
| 2016/0011598 A1* | 1/2016 | Biderman | | B60R 25/1003 |
| | | | | 701/22 |
| 2016/0011599 A1* | 1/2016 | Biderman | | A61B 5/6893 |
| | | | | 701/22 |
| 2016/0012652 A1* | 1/2016 | Biderman | | A63B 21/22 |
| | | | | 340/5.61 |
| 2016/0012721 A1* | 1/2016 | Biderman | | B60L 15/20 |
| | | | | 701/117 |
| 2016/0012723 A1* | 1/2016 | Biderman | | B62B 3/00 |
| | | | | 340/990 |
| 2016/0014205 A1* | 1/2016 | Biderman | | B60K 7/0007 |
| | | | | 709/201 |
| 2016/0014252 A1* | 1/2016 | Biderman | | A61B 5/7275 |
| | | | | 455/420 |
| 2016/0236353 A1* | 8/2016 | Ke | | B25J 13/003 |
| 2018/0208204 A1* | 7/2018 | Chen | | B60W 50/085 |
| 2018/0208208 A1* | 7/2018 | Chen | | B60R 16/037 |
| 2019/0196488 A1* | 6/2019 | Holmberg | | G05D 1/0225 |
| 2019/0250622 A1* | 8/2019 | Nister | | B60W 30/08 |

* cited by examiner

STANDING TEST DEVICE FOR MOBILE ROBOTS

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices ("robots") guided by computer control systems. The computer control systems may localize the one or more robots in relation to markers distributed throughout the warehouse. Localizing the robots may allow the computer control systems to navigate the one or more robots through the warehouse.

SUMMARY

Example systems and methods may relate to testing the efficacy of sensors on a mobile robot. A plurality of mobile robots may be periodically deployed within an environment to perform various tasks. However, where a sensor of a given mobile robot is not working properly, the mobile robot may be unable to effectively navigate within the environment. Accordingly, a standing test device may be disposed within the environment to test robot sensors. A controller can periodically instruct the mobile robots to navigate toward the standing test device as part of a robot sensor testing procedure in which the mobile robot sensors are vetted. The standing test device may include sensors configured to determine sensor data that shows a plurality of distances between each mobile robot and the standing test device recorded during sensor testing procedures. The sensor data may be used to determine an approach motion profile for a mobile robot instructed to navigate toward the standing test device. The approach motion profile may indicate whether the mobile robot detected the standing test device and whether the mobile robot took appropriate action after detecting the standing test device.

In one example, a method is provided that includes causing a mobile robot to navigate toward a standing test device placed within an environment of the mobile robot. The method further includes receiving, from a proximity sensor on the standing test device, sensor data indicative of proximity of the mobile robot to the standing test device as the mobile robot navigates toward the standing test device. The method also includes determining, based on the sensor data received from the proximity sensor on the standing test device, an approach motion profile followed by the mobile robot in navigating toward the standing device. The method additionally includes providing a control instruction for the mobile robot based on the determined approach motion profile.

In another example, a system is provided that includes a freestanding housing, a proximity sensor disposed on the housing, and one or more processors. The system also includes a non-transitory computer-readable medium and program instructions stored on the non-transitory computer readable medium and executable by the one or more processors to perform functions. The program instructions are executable to receive an identifier for a mobile robot from a control system that has instructed the mobile robot to navigate toward the standing test device as part of a robot sensor testing procedure. The program instructions are also executable to identify the mobile robot as the mobile robot approaches the housing. The program instructions are further executable to determine, from the proximity sensor, proximity data comprising a plurality of distances between the housing and the mobile robot. The program instructions are additionally executable to associate the proximity data with the identifier, and send data representative of the proximity data and the identifier to the control system.

In another example, a non-transitory computer readable medium is provided having stored therein instructions executable by one or more processors to cause a computing system to perform functions. The functions include causing a mobile robot to navigate toward a standing test device placed within an environment of the mobile robot. The functions further include receiving, from a proximity sensor on the standing test device, sensor data indicative of proximity of the mobile robot to the standing test device as the mobile robot navigates toward the standing test device. The functions also include determining, based on the sensor data received from the proximity sensor on the standing test device, an approach motion profile followed by the mobile robot in navigating toward the standing device. The functions additionally include providing a control instruction for the mobile robot based on the determined approach motion profile.

In another example, a system is provided that includes means for causing a mobile robot to navigate toward a standing test device placed within an environment of the mobile robot. The system also includes means for receiving, from a proximity sensor on the standing test device, sensor data indicative of proximity of the mobile robot to the standing test device as the mobile robot navigates toward the standing test device. The system further includes means for determining, based on the sensor data received from the proximity sensor on the standing test device, an approach motion profile followed by the mobile robot in navigating toward the standing device. The system additionally includes means for providing a control instruction for the mobile robot based on the determined approach motion profile.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
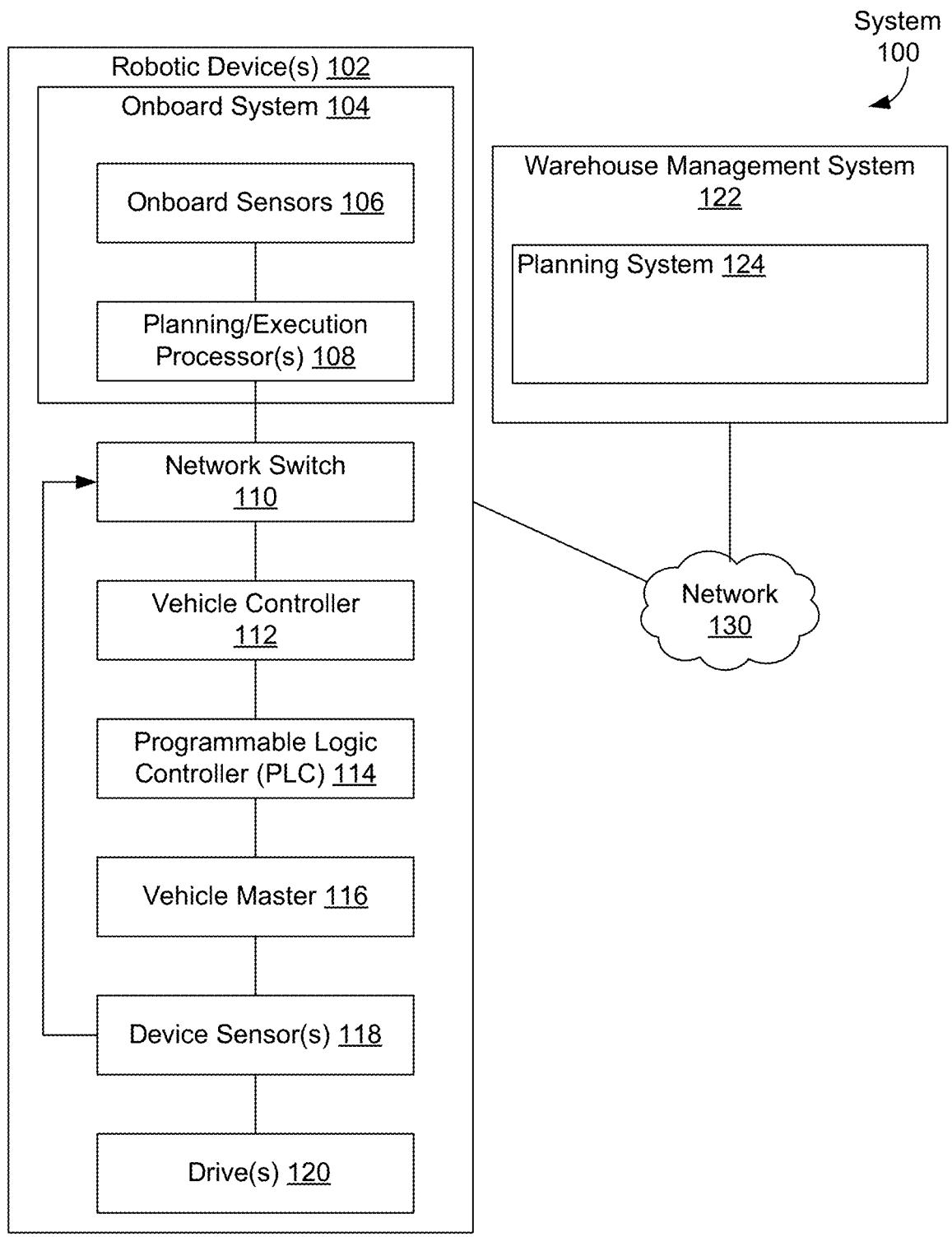
FIG. 1 illustrates a system, in accordance with example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

Example embodiments may include or otherwise relate to systems and methods that may be used to assist in testing sensors on mobile robots. For example, a standing test device can be provided that includes one or more sensors configured to determine proximity data indicative of a plurality of distances between a given mobile robot and the standing test device. The proximity data can be used to determine an approach motion profile of the mobile robot, which can be used to determine whether and when the mobile robot detects the standing test device, and whether the mobile robot takes appropriate action after detecting the standing test device.

Mobile robots may be deployed within an environment to perform various tasks. To perform its tasks effectively, a given mobile robot can rely on one or more sensors to detect obstructions in the environment and to navigate through the environment accordingly. For example, the given robot may include a light detection and ranging (LIDAR) device configured to provide three dimensional point cloud data that is representative of the environment. Where the one or more sensors fail to effectively detect an obstruction, the mobile robot may be unable to avoid such obstructions, and therefore may be unable to navigate within the environment. Accordingly, a standing test device can be used to test the efficacy of one or more sensors on the robot.

In some examples, as part of a robot sensor testing procedure, a control system configured to control a plurality of mobile robots may cause each robot of the plurality to navigate toward the standing test device in turn. The standing test device can include a proximity sensor that provides proximity data indicative of a plurality of distances between a given robot of the plurality of robots and the standing test device. The standing test device or the control system can determine an approach motion profile for the given robot. The term "approach motion profile" refers to a representation of movement of a mobile robot over time relative to the standing test device. In some examples, the approach motion profile is an approach velocity profile. In further examples, the approach motion profile includes indications of distances, accelerations, and/or jerks of the mobile robot as it approaches a standing test device as well or instead of velocity. The control system can provide a control instruction to the given mobile robot based on the determined approach motion profile.

An approach motion profile of a mobile robot can be indicative of a detection time at which the robot detects the standing test device, a distance between the robot and the standing test device at the detection time, and a stopping distance of the mobile robot after detecting the standing the device. Each of these can be used to determine the efficacy of sensors on the mobile robot.

Where sensors of the mobile robot are determined to operate properly, the mobile robot may be instructed to continue navigating through the environment. However, where the sensors are determined to be ineffective, the mobile robot may be instructed to await manual control. In this fashion, mobile robots that are not suited to perform their tasks can be controlled without risk of colliding with obstructions in the environment.

A standing test device may include a freestanding housing and a proximity sensor disposed on the housing. Other sensors, such as one or more image capture devices or one or more impact sensors may be included as well. In some examples, the housing may have a convex bottom and a low center of gravity such that, should a mobile robot impact the standing test device, the standing test device can return to a standing position. Configuring the standing test device is this way allows for many instances of testing mobile robots without risk of damaging the standing test device or the robots.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

II. SYSTEM DESIGN FOR ROBOTIC DEVICES

FIG. 1 illustrates a system 100 that includes warehouse management system 122, and one or more robotic devices 102 connected using network 130, in accordance with an example embodiment.

Warehouse management system 122 can be a centralized control service running on and storing data using one or more computing devices; e.g., server computing devices. To perform these tasks, warehouse management system 122 can include WMS middleware and can provide a user interface to provide access to tools for monitoring and managing system 100. The WMS middleware and/or other components of warehouse management system 122 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 122 can provide one or more user interface functions for system 100, including, but not limited to: monitoring of robotic device(s) 102, e.g, presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 102; and reviewing, updating, deletion, and/or insertion of data related to one or more warehouse maps, pallets, networks, and/or planning systems (e.g., planning system 124 and/or warehouse management system 122).

FIG. 1 shows that each of the one or more robotic devices 102 can include one or more of: onboard system 104, network switch 110, vehicle controller 112, programmable logic controller (PLC) 114, one or more device sensors 118, and one or more drives 120.

Onboard system 104 can be a computation and sensor package for robotic planning configured for installation into and use with robotic device 102, where onboard system 104 can include onboard sensors 106 and one or more planning/execution processors 108. FIG. 1 also shows that onboard system 104 that is configured to use network switch 110 at least to communicate with planning system 124 (via network 130), with device sensors 118, and/or with one or more actuators of robotic device 102.

Onboard system 104 can be responsible for one or more of: localization of robotic device 102, generation of local trajectories to carry out plans and/or travel along paths and/or trajectories provided by warehouse management system 122, generation of commands to drives 120 to follow one or more (local) trajectories, generation of commands to control actuator(s) of robotic device 102, and reporting pose, status and/or other information to warehouse management system 122.

Onboard sensors 106 can include one or more navigation lasers, laser scanners, cameras, and/or other sensors for navigating and/or controlling onboard system 104. For example, a robotic device of robotic device(s) 102 can include one or more laser scanners, such as one or more laser scanners provided by SICK AG of Waldkirch, Germany, HOKUYO AUTOMATIC CO. LTD of Osaka, Japan, and/or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 108 can include one or more computer processors connected at least to onboard sensors 106. Planning/execution processor(s) 108 can read data from onboard sensors 106, generate local trajectories and/or commands to drive(s) 120 to move robotic device 102, and communicate with warehouse management system 122. A local trajectory can be a trajectory where robotic device 102 starts at a starting pose and reaches an ending pose at some time. In some examples, the starting pose can be implicitly specified; e.g., the starting pose can be a current pose of robotic device 102 and so the local trajectory be based on an assumption that its starting pose is the current pose of robotic device 102.

Planning/execution processor(s) 108 can utilize a component framework. The component framework can be a multi-threaded job scheduling and message passing system built on software libraries for input/output (I/O) and signaling configured to provide a consistent asynchronous model of robotic device 102, such as the "boost::asio" and "boost::signals2" software libraries provided by boost.org of Onancock, Va. The component framework can enable communication between software components (or modules) so that the software components can be executed in parallel in a thread safe manner.

Network switch 110 can enable communications for robotic device(s) 102. These communications can include, but are not limited to, communications between onboard system 104 and the rest of robotic device 102; e.g, device sensors 118 and drives 120, and communications with warehouse management system 122 via network 130. For example, network switch 110 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 102 and planning system 124 can include remote procedure calls (RPCs). The remote procedure calls can allow invocation of software procedures, methods, and/or functions resident on one or more of robotic device(s) 102 by software of planning system 124 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 112 and/or programmable logic controller 114 can provide electrical and sensor management functionality for robotic device(s) 102. The electrical and sensor management functionality can include, but is not limited to, functionality for electrical load control, lighting control, sensor control, sensor and/or switch signal processing, and power management. Vehicle master 116 can provide functionality for controlling one or more actuators, such as lift devices, of robotic device(s) 104.

Device sensor(s) 118 can include one or more sensors that can provide data related to controlling and/or operating robotic device(s) 102. The data can provide information about an environment about robotic device(s) 102, such as but not limited to, localization information, position estimates, and mapping data. For example, device sensor(s) 118 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 120 can include one or more drive controllers and/or actuators that provide functionality for moving robotic device(s) 102. The drive controllers can direct the drive actuators to control movement of robotic device(s) 102. The drive actuators can include one or more traction motors, electric drives, hydraulic drives, and pneumatic drives.

Figure 2:
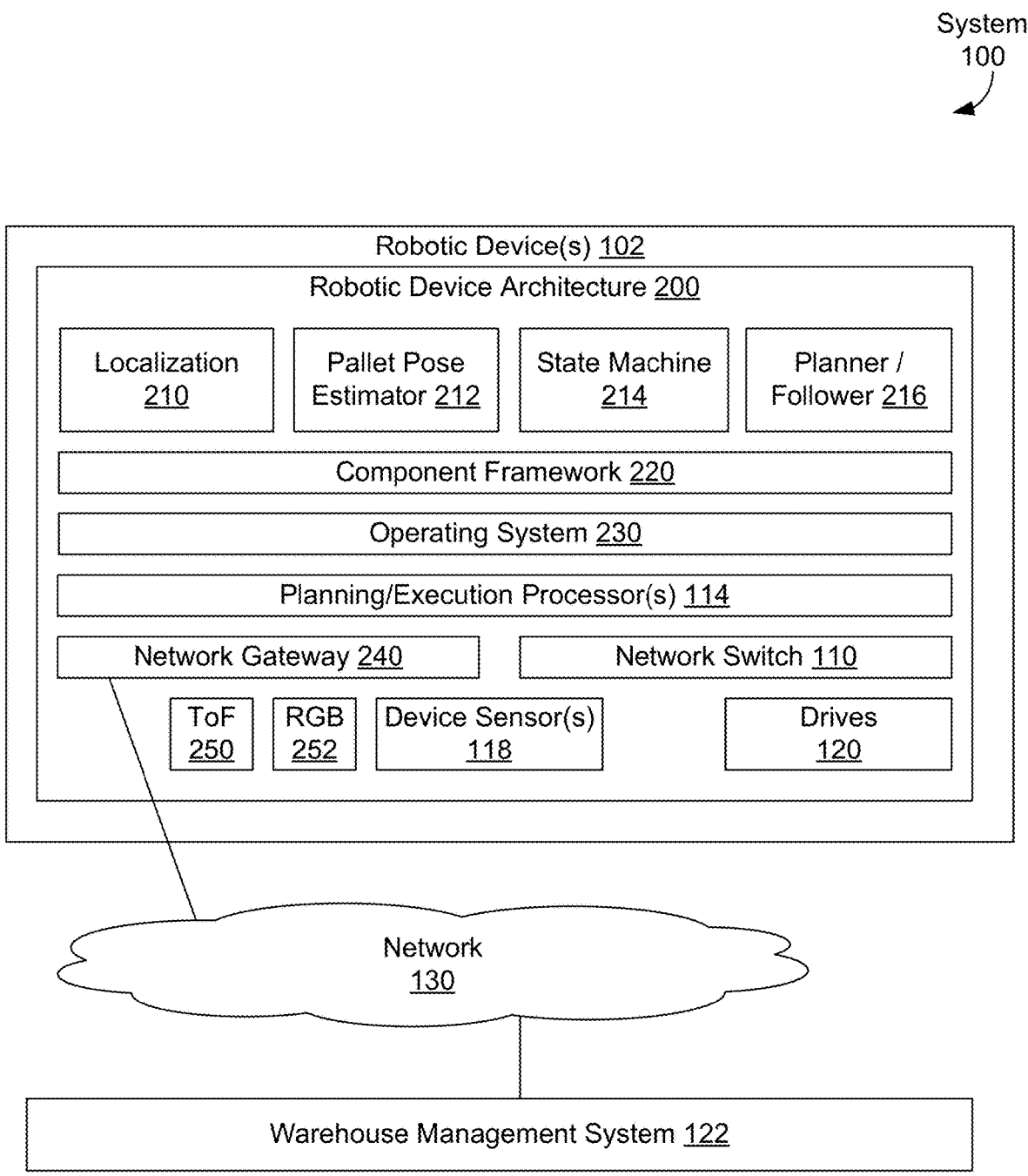
FIG. 2 illustrates a robotic device architecture for one or more robotic devices, in accordance with example embodiments.

FIG. 2 illustrates robotic device architecture 200 of robotic device(s) 102, in accordance with an example embodiment. Robotic device architecture 200 of robotic device(s) 102 can include software. The software can include software for localization 122, software for a pallet pose estimator 212, software related to state machine 214, software for planner follower 216, software for component framework 220 and software for operating system 230. The software can be executed by one or more hardware planning/execution processors 108. Communications between robotic device(s) 102 and other devices can be carried out using network gateway 240 and/or network switch 110. For example, network gateway 240 can be used for wireless communications with and within a robotic device of robotic device(s) 102 and network switch 110 can be used for wireline communications with and within a robotic device of robotic device(s) 102. Robotic device architecture 200 also includes additional hardware such as device sensor(s) 118 and drive(s) 120 discussed above in the context of FIG. 1. In some embodiments, robotic device architecture 200 can include one or more cameras, including but not limited to, ToF camera 250 and RGB camera 252, where the one or more cameras can include one or more still cameras and/or one or more video cameras.

III. TESTING SENSORS ON A ROBOT

Figure 3:
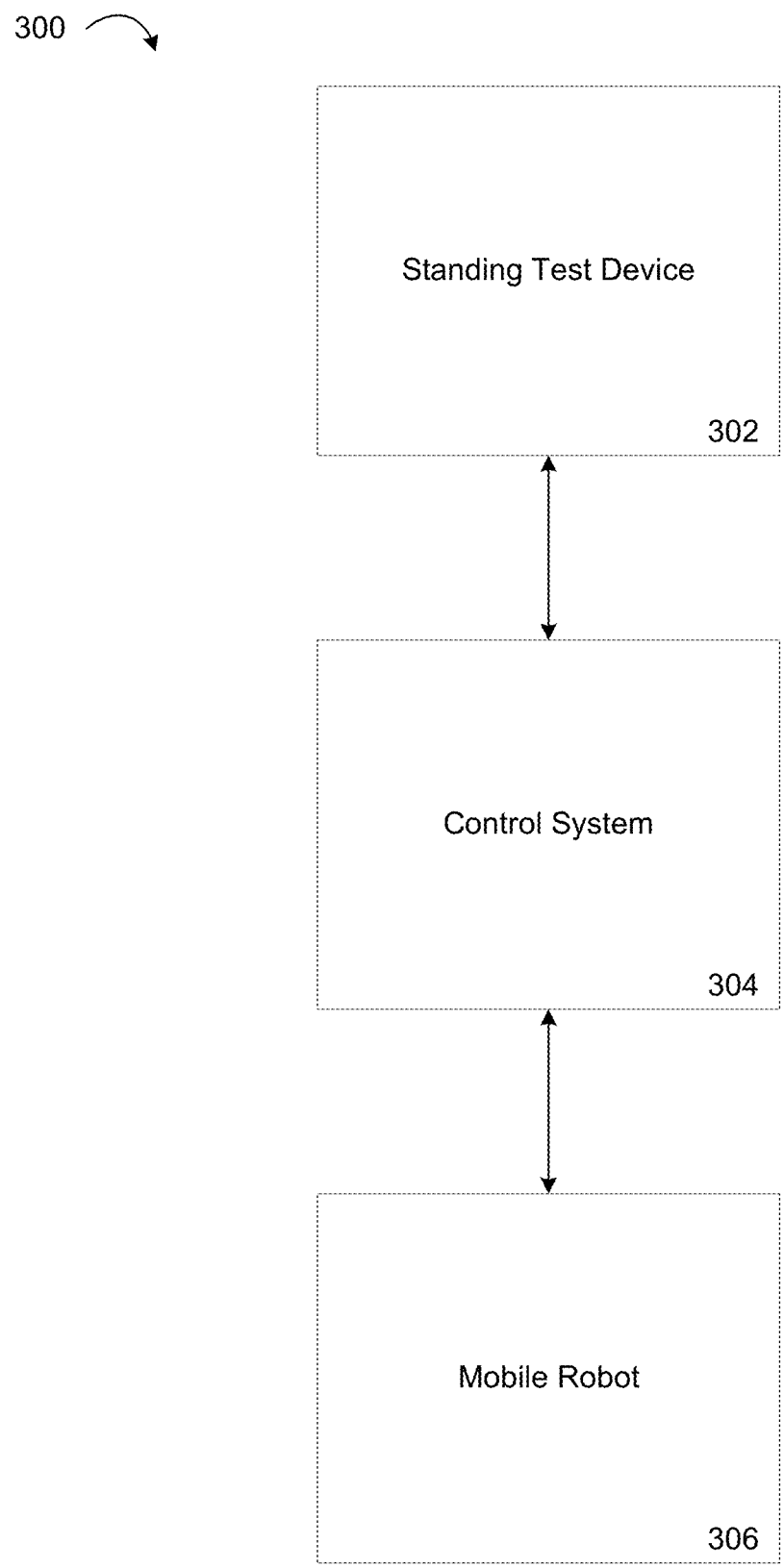
FIG. 3 is block diagram of a system, in accordance with example embodiments.

FIG. 3 is a block diagram of a system 300, in accordance with example embodiments. System 300 includes a standing test device 302, a control system 304, and a mobile robot 306. Mobile robot 306 can be the same or similar to robotic device 102 described above with regard to FIGS. 1 and 2. Control system 304 can be configured to control one or more mobile robots, and can be the same or similar to planning system 124, or warehouse management system 122 described above with regard to FIGS. 1 and 2. In other examples, control system 304 can be disposed within mobile robot 306 or standing test device 302. In still other examples, control system 304 can be a remote controller configured to control one or more mobile robots and/or one or more standing test devices. Standing test device 302 may be placed within an environment of mobile robot 306, and may communicate with control system 304 to test one or more sensors on mobile robot 306.

Figure 4:
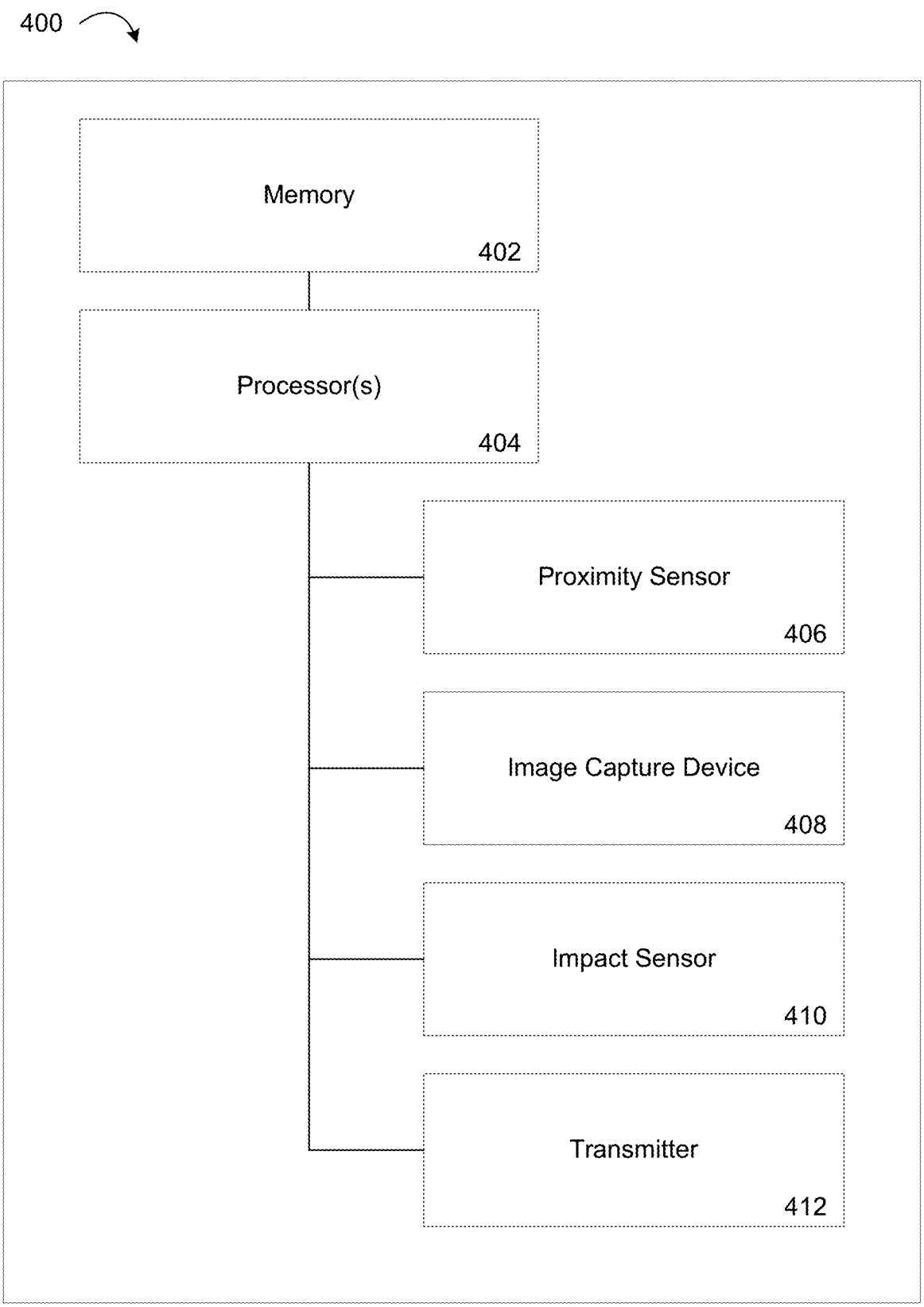
FIG. 4 is a block diagram of a standing test device, in accordance with example embodiments.

FIG. 4 is a block diagram of a standing test device 400, in accordance with example embodiments. Standing test device 400 can include a memory 402, and one or more processors 404. Memory 402 can include a non-transitory computer-readable medium having instructions stored thereon. The instructions can be executable by one or more processors 404 to perform functions of standing test device 400.

Standing test device 400 can also include a proximity sensor 406 configured to detect a plurality of distances between standing test device 400 and a mobile robot, such as mobile robot 306 described above with regard to FIG. 3. Proximity sensor 406 can be configured to generate proximity data based on the detected plurality of distances. In other examples, the program instructions may be executable by one or more processors 404 to determine the proximity data from proximity sensor 406. Proximity sensor 406 can include a LIDAR device, such as a 360 degree LIDAR device, a laser rangefinder, a radar device, or some combination thereof. Proximity sensor 406 may also include a plurality of these devices. Other types of proximity sensors are possible as well.

Standing test device 400 can also include an image capture device 408, such as an RGB camera, infrared camera, or other device configured to capture one or more images of the environment. The program instructions can be executed by one or more processors 404 to detect a mobile robot within the environment, to detect a visual identifier disposed on the mobile robot, and/or to determine a proximity between the mobile robot and standing test device 400. Other ways of using the one or more images are possible as well.

Standing test device 400 can also include an impact sensor 410. Impact sensor 410 can detect a force, where the force is indicative of an impact between a mobile robot and standing test device 400. The program instructions can be executed to determine a velocity of the mobile robot while impacting the standing test device. The impact sensor 410 can include one or more of a pressure sensor and an accelerometer, though other types of sensors are possible as well.

One or more of the proximity data, one or more captured images, and detected impact data can be logged by standing test device 400. For example, the program instructions may be executable by one or more processors 404 to associate an identifier of a particular mobile robot with one or more of proximity data, one or more captured images, and detected impact data, and to store such information in memory 402. Further, the program instructions can be executed to send this information to a control system, such as control system 304 described above with regard to FIG. 3.

Standing test device 400 can also include a transmitter 412. Transmitter 412 can be configured to send information to a control system, such as control system 304 described above with regard to FIG. 3, or a mobile robot such as mobile robot 306 described above with regard to FIG. 3. In some examples, transmitter 412 can be part of a transceiver configured to receive control signals from the control system or to communicate with a mobile robot.

In some examples, the program instructions can be executable by one or more processors 404 to receive an identifier for a mobile robot from the control system where the control system has instructed the mobile robot to navigate toward standing test device 400 as part of a robot sensor testing procedure. As the mobile robot approaches standing test device 400, the program instructions can be executed to identify the mobile robot. For example, proximity sensor 406 can make detections in multiple directions, and the program instructions can determine that most directions include static proximity data, while another direction includes changing proximity data indicative of a mobile robot approaching standing test device 400. In other examples, a mobile robot can send a signal to standing test device 400 that it will commence navigating toward standing test device 400. In these examples, the program instructions can be executable to associate the received signal from the mobile robot with the received identifier. In still other examples, an image captured by image capture device 408 can be used to identify the mobile robot. For instance, the program instructions can be executed to detect that a mobile robot is within a field of view of the image capture device, and associate the detected mobile robot with the received identifier. In other examples, the program instructions can be executed to detect a visual indication of the identifier that is disposed on a surface of the mobile robot. Other ways of identifying the mobile robot as it approaches the housing are possible as well.

The program instructions can be further executed to associate proximity data from proximity sensor 406 with the received identifier. The associated proximity data and identifier can be logged within memory 402, or sent, via transmitter 412, to the control system.

Though standing test device 400 is depicted as including proximity sensor 406, image capture device 408, impact sensor 410, and transmitter 412, it should be understood that additional sensors or components can be included in other embodiments. Further, some embodiments may not include each of these components. For instance, in some examples, standing test device 400 might only include proximity sensor 406. Other combinations of components are possible as well.

Figure 5:
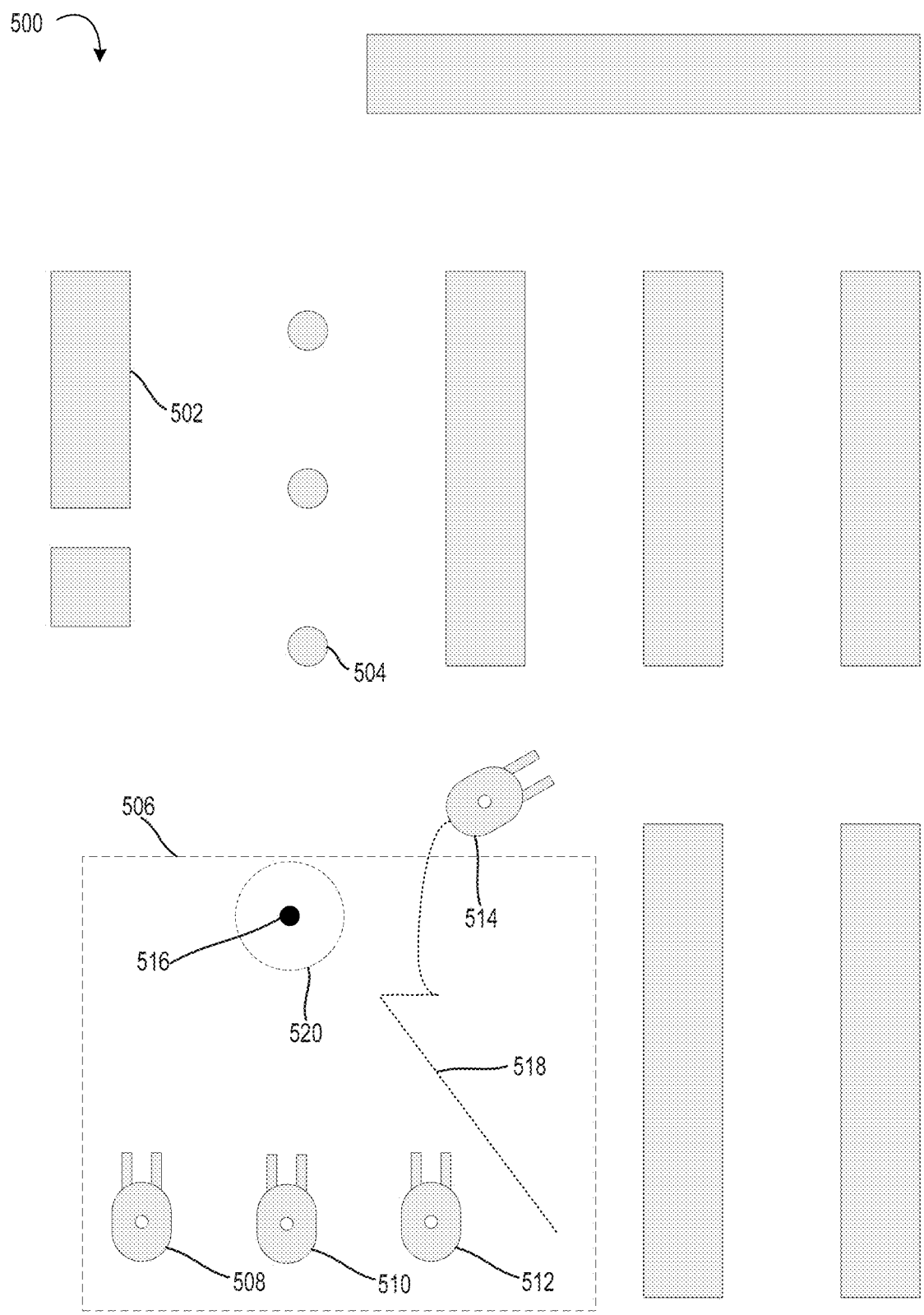
FIG. 5 shows an environment of a plurality of robots, in accordance with example embodiments.

FIG. 5 illustrates an environment 500 of a plurality of mobile robots, in accordance with example embodiments. Environment 500 includes obstacles, such as obstacles 502 and 504 around which mobile robots in the system will navigate while performing tasks.

The environment can include a testing zone 506. In the present example, mobile robots 508, 510, and 512 are depicted within testing zone 506, while mobile robot 514 is depicted as having left testing zone 506. For the purposes of the present example, it can be assumed that one or more sensors on mobile robot 514 have been tested and that sensors on mobile robots 508, 510, and 512 have yet to be tested.

A control system can instruct each of mobile robots 508, 510, 512, and 514 to navigate toward standing test device 516 as part of a robot sensor testing procedure. As a part of the procedure, each of mobile robots 508, 510, 512, and 514 can navigate toward standing test device 516 in turn. However, in other examples, multiple mobile robots can navigate toward standing test device 516 at the same time. Further, the robot sensor testing procedure can be periodic and regular, such that the mobile robots are tested on a schedule, or according to repeated instructions. For example, the control system can instruct each mobile robot to navigate towards a standing test device every day.

In some examples, a plurality of standing test devices can be provided throughout environment 500. In such examples, a control system can periodically instruct each mobile robot of the plurality to navigate towards a nearest standing test device of the plurality.

In other examples, the mobile robots can test their sensors automatically. For example, each time a mobile robot turns on, it may automatically navigate toward standing test device 516 before deploying to perform tasks within environment 500. In other instances, the mobile robots might automatically navigate toward standing test device 516 each time a testing period has elapsed, or each time the mobile robot passes within a threshold distance of standing test device 516. In such examples, the mobile robots might not navigate toward standing test device 516 based on control instructions from a control system.

In the present example, a control system has caused mobile robot 514 to navigate toward standing test device 516 prior to performing tasks within environment 500. The control system can receive sensor data from standing test device 516, where the proximity data is indicative of proximity of mobile robot 514 to standing test device 516 as mobile robot 514 navigates toward standing test device 516. The control system can determine, based on the received proximity data, an approach motion profile followed by mobile robot 514 as it approaches standing test device 516. In the present example, the approach motion profile for mobile robot 514 is represented as path 518. The approach motion profile may include information representative of path 518 in addition to relative velocities of mobile robot 514 as it follows path 518. The approach motion profile can also be indicative of whether mobile robot 514 stopped within threshold distance 520 of standing test device 516. The approach motion profile can also be indicative of a stopping distance of mobile robot 514 after mobile robot 514 detected standing test device 516, or a level of deceleration of mobile robot 514 after detecting standing test device 516.

Based on information determinable from the approach motion profile, the control system can determine whether one or more sensors on mobile robot 514 are working improperly, or that mobile robot 514 is otherwise operating improperly. The control system can send a control instruction to mobile robot 514 based on its determination. Other criteria can be considered in determining how to instruct mobile robot 514. For example, the control system can account for internal diagnostics of mobile robot 514. Accordingly, in some examples the robot sensing testing procedure can be redundant to other methods of determining the efficacy of one or more sensors disposed on each mobile robot in environment 500.

As part of the robot sensor testing procedure, the control system can also interact with standing test device 516. For example, standing test device 516 can be instructed by the control system to navigate to testing zone 506. Further, the control system can send, to standing test device 516, an identifier for a mobile robot. For instance, in the present example, mobile robot 514 has been tested and deployed within environment 500. The control system may next send an identifier of mobile robot 508 to standing test device 516 while also sending a control signal to mobile robot 508 to navigate toward standing test device 516. The standing test device may associate proximity data for an approaching mobile robot with the received identifier before sending the proximity data to the control system.

Where a mobile robot does not stop within threshold distance 520, does not detect standing test device 516 within a detection distance threshold, or the control system otherwise determines that a sensor on the mobile robot is not working properly, the control system can send a control instruction to the mobile robot that causes the robot to take a different action rather than any scheduled tasks it has within the environment. For example, mobile robot 508 might not detect standing test device 516, and may impact standing test device 516. In response, standing test device 516 can send a signal to the control system, or to mobile robot 508 directly, that causes mobile robot 508 to stop. The control system can responsively cause mobile robot 508 to await manual control, to reverse along its path, or to take a different passive action. In such examples where a mobile robot has a sensor deemed not to work properly, tasks assigned to that mobile robot can be reassigned to another mobile robot. For instance, the control system can reassign tasks from mobile robot 508 to mobile robot 510, and instruct mobile robot 510 to navigate toward standing test device 516 as part of the robot sensor testing procedure.

As described above with regard to FIG. 3, a control system, such as control system 304, can be included within a mobile robot, such as mobile robot 508, or within a standing test device, such as standing test device 516. In other examples, the control system can be a central server or servers, such as warehouse management system 122, configured to control mobile robots according to the robot sensor testing procedure. In such examples, the control system can receive proximity data associated with a plurality of mobile robots that has been logged by one or more standing test devices, and can use this data to evaluate the mobile robots, and to control the mobile robots based on the evaluation. For example, the control system can maintain a date and time stamped log of data associated with each robot to determine how the robot performs over time. In this fashion the control system can determine whether software or firmware updates, or replacement sensors for a given robot have improved the robot's ability to detect a standing test device.

Figure 6A:
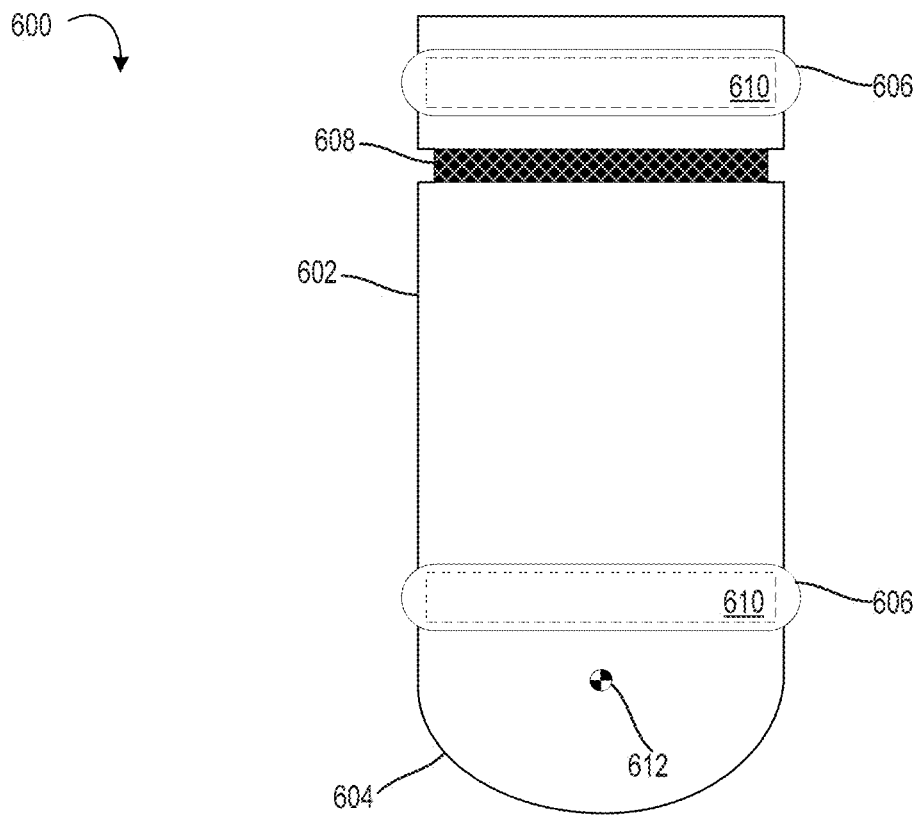
FIG. 6A illustrates a side view of a standing test device, in accordance with example embodiments.
Figure 6B:
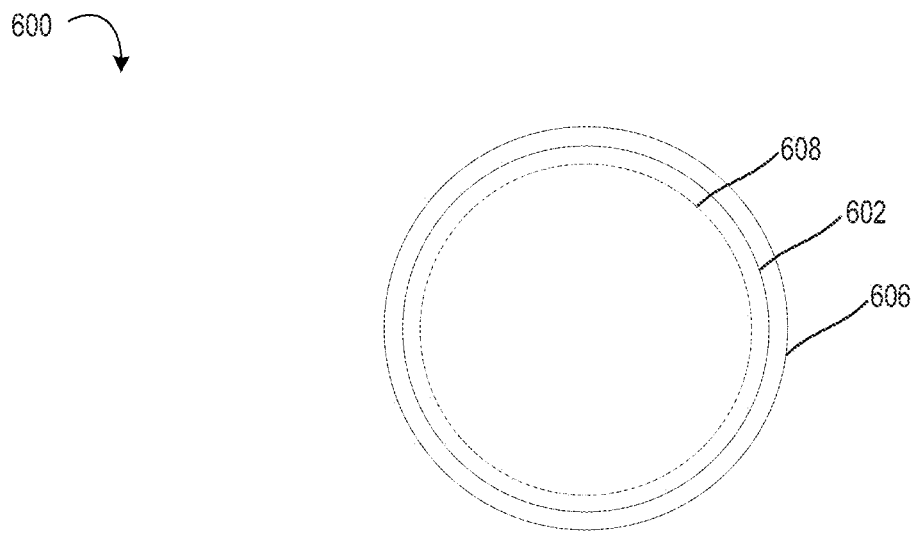
FIG. 6B illustrates a top view of a standing test device, in accordance with example embodiments.

FIG. 6A illustrates a side view of a standing test device 600, in accordance with example embodiments and FIG. 6B illustrates a top view of the standing test device 600, in accordance with example embodiments. In the present example, standing test device 600 includes a housing 602. The housing includes a rounded bottom portion 604, and two bumpers 606. Standing test device 600 also includes a proximity sensor 608 disposed on housing 602, and two impact sensors 610.

Housing 602 may be configured such that one or more sensors on a mobile robot are capable of detecting standing test device 600. In particular, housing 602 may be detectable by a LIDAR device on a mobile robot. However, housing 602 may also be smaller than typical obstructions in an environment of a mobile robot. For example, a width of housing 602 may resemble that of a human leg to ensure that sensors on the mobile robots are operable to function properly in a collaborative environment with humans and robots. Accordingly, housing 602 may have a diameter greater than 70 millimeters (mm) and less than 200 mm. Further, a mobile robot may use one or more planar LIDAR devices to detect obstructions within the environment, and so standing test device may be have a height greater than a sensing plane of the planar LIDAR device. Accordingly, housing 602 may have a height greater than 400 mm and less than 600 mm.

Different standing test devices can have different form factors. For instance, one or more first standing test devices in an environment can have a form factor of about 70 mm width and about 200 mm height, while one or more second standing test devices can have a form factor of about 200 mm width and about 600 mm height. Other variations and dimensions are possible as well. For example, though housing 602 is depicted as a cylinder, one or more third standing test devices can be shaped as a rectangular prism. The third standing test devices can have a form factor of about 500 mm width, 500 mm height, and about 100 mm depth. Other form factors and shapes for standing test devices are possible as well. Accordingly, different standing test devices can resemble various common obstructions within an environment. In the present example, the first standing test devices can resemble the dimensions of a human leg, the second standing test devices can resemble the dimensions of a human torso, and the third standing test devices can resemble the dimensions of a wall or barrier. A mobile robot may be better suited for detecting some objects than others. Accordingly, testing a mobile robot according to the robot sensor testing procedure can include periodically causing the robot to navigate to each type of standing test device.

Further, the robot's ability to detect an obstruction may be dependent on an orientation of the object relative to the robot. For instance, a mobile robot may be better suited for detecting a wall at a first angle than at a second angle. Accordingly, the mobile robot can be instructed to navigate towards the same standing test device according to multiple trajectories having different relative angles between the mobile robot and the standing test device. In other examples, a trajectory can be selected based on a desired orientation of the standing test device relative to the robot.

Standing test device 600 may sustain multiple impacts from mobile robots. Accordingly, standing test device 600 may include one or more bumpers 606 configured to lessen the force imparted on other components of standing test device 600. Further, housing 602 may be freestanding to further lessen a force of impact between a mobile robot and standing test device 600. In the present example, a convex lower portion 604 of housing 602 is rounded, and housing 602 has a center of gravity 612 within the lower portion such that housing 602 is freely movable upon an application of force to housing 602, and such that housing 602 returns to a vertical orientation after the application of force. Accordingly, standing test device 600 can sustain several collisions with one or more mobile robots and still serve as a means of testing sensors on the robots. Though standing test device 600 is depicted as having a rounded bottom, other shapes are possible as well. For instance, the lower portion of housing 602 can have a substantially flat bottom.

Housing 602 may be cylindrical, and may include sensors that receive information in all directions such that standing test device 600 has a 360 degree field of view. For example, proximity sensor 608 can include an array of sensors dispersed radially along a vertical axis of housing 602. Accordingly, in some examples, standing test device 600 can determine proximity data between two or more mobile robots relative to standing test device 600 at the same time. Though housing 602 is depicted as being cylindrical, other geometries are possible as well. For example, the housing can be conical or spherical.

Though standing test device 600 is only depicted as including proximity sensor 608 and impact sensors 610, other sensors and components can be included. For example, standing test device 600 can further include one or more image capture devices and a transceiver. Standing device 600 can also include a memory and one or more processors configured to executed program instructions stored on the memory. Other components are possible as well.

In some embodiments, standing device 600 can be static. However, in other embodiments, standing test device 600 can include one or more wheels, or other means for navigating in an environment. Accordingly, standing test device 600 may be configured to navigate to a location as part of a robot sensor testing procedure, such as that described above with regard to FIG. 5.

Figure 7:
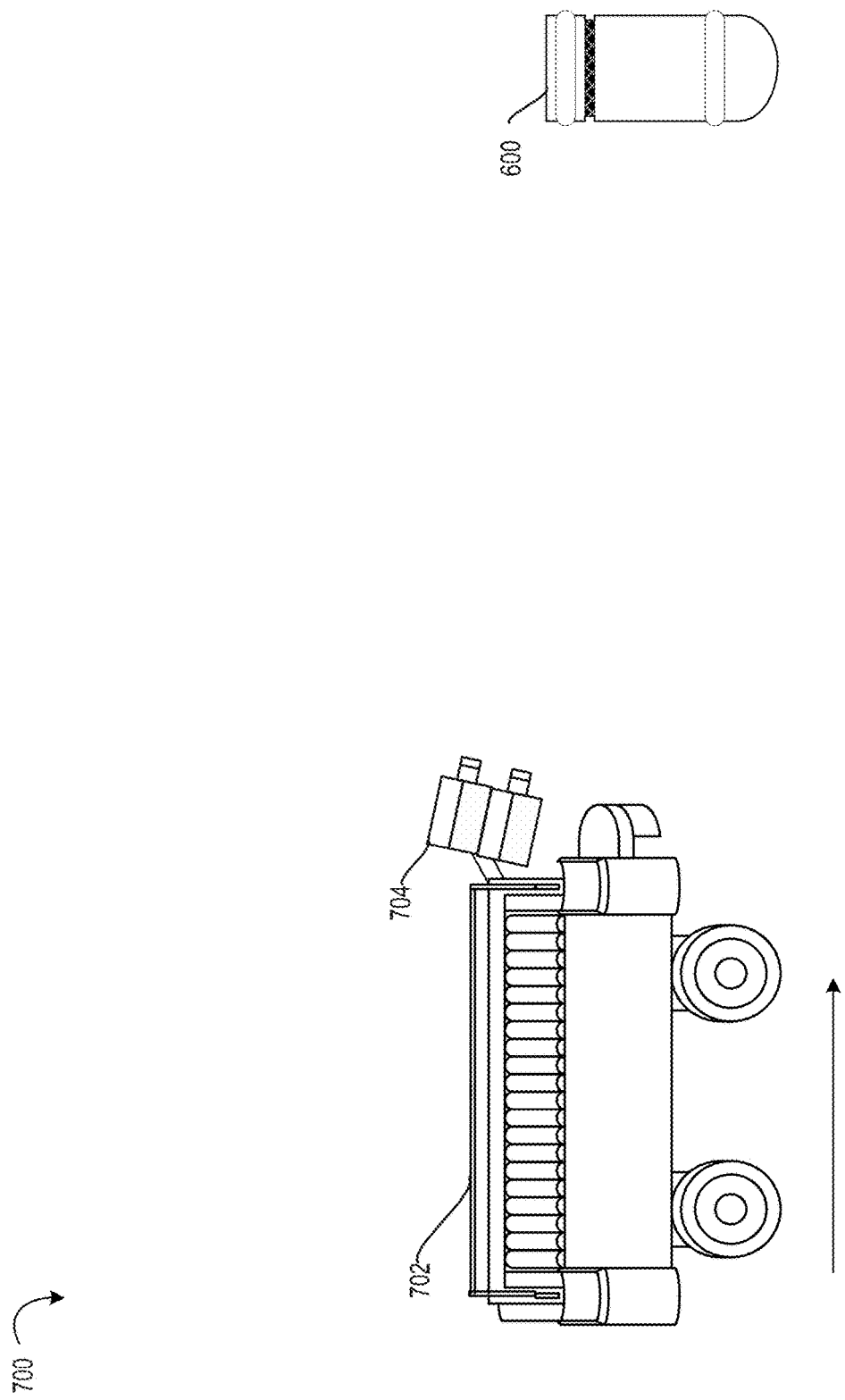
FIG. 7 illustrates a mobile robot navigating toward a standing test device, in accordance with example embodiments.

FIG. 7 illustrates an environment 700 where a mobile robot 702 is navigating toward a standing test device 600, in accordance with example embodiments. To test one or more sensors 704 of mobile robot 702, robot 702 may follow a trajectory to navigate toward standing test device 600. Standing test device 600 can sequentially obtain sensor data that indicates proximity between mobile robot 702 and standing test device 600. From the data, an approach motion profile can be determined that is indicative of a plurality of distances between mobile robot 702 and standing test device 600. Other information can be represented as well, such as the trajectory followed by mobile robot 702, and the relative velocity between mobile robot 702 and standing test device 600 over time.

One or more sensors 704 on mobile robot 702 can include stereo camera, such as that depicted in FIG. 7, a LIDAR device and/or an image capture device. Other sensors are possible as well. Under some circumstances, one or more of such devices may fail such that robotic vehicle 702 is unable to detect standing test device 600 within an acceptable distance. In other examples, robotic vehicle 702 may erroneously process data received from the one or more sensors 704 and thereby fail to detect standing test device 600. In still other examples robotic vehicle 702 may receive correct sensor data from one or more sensors 704, and correctly process the received data to detect standing test device 600, but may nonetheless fail to take an appropriate action such as stopping or following an alternative trajectory.

A control system may determine that mobile robot 702, or one of sensors 704 has failed by evaluating one or more of a distance at which mobile robot 702 detects standing device 600, a stopping distance of mobile robot 702 after detecting standing test device 600, a level of deceleration of mobile robot 702 after detecting standing test device 600, and whether mobile robot 702 stopped moving relative to standing test device 600 before reaching a threshold perimeter surrounding standing test device 600. The control system may determine a metric for evaluating mobile robot 702 based on one or more of these factors. The control system may weigh one or more factors more than others in determining the metric. For example, the control system may always determine a failing metric for mobile robot 702 when mobile robot 702 does not stop moving relative to standing test device 600 before reaching the threshold perimeter surrounding standing test device 600. Other ways of calculating a metric for evaluating performance of mobile robot 702 are possible as well.

Figure 8:
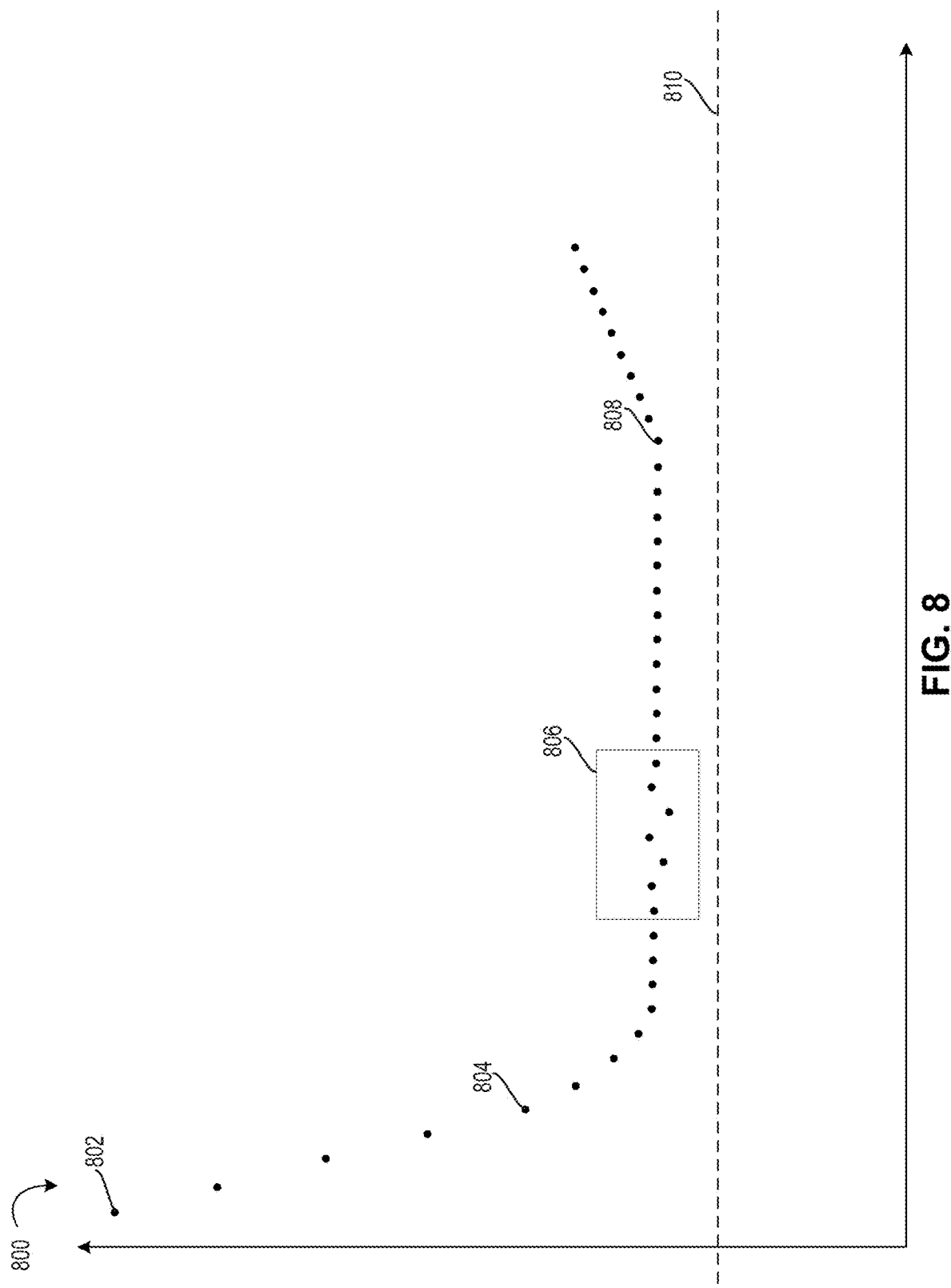
FIG. 8 illustrates proximity data between a mobile robot and a standing test device, in accordance with example embodiments.

FIG. 8 illustrates proximity data 800 between a mobile robot and a standing test device, in accordance with example embodiments. As described above with regard to FIG. 7, a proximity sensor on a standing test device may successively determine a proximity between a mobile robot and the standing test device. As depicted in FIG. 8, proximity data 800 can be represented as a distance value over a time value. For example, a first data point is indicative of a first distance between the mobile robot and the standing test device determined at a first time 802.

An approach motion profile may be determined from the sensor data. Based on proximity data 800 provided in the present example, it can be determined that a mobile robot slowed down after a second time 804, that the mobile robot came to a complete stop within time range 806, and that the mobile robot started to move away from the standing test device at time 808. It can be further determined that the mobile robot stopped before reaching a perimeter threshold 810 surrounding the standing test device.

Determining that the mobile robot can include a recognition pattern such as that depicted in time range 806, which provides an exaggerated representation of a stopping mobile robot. The distances fluctuate because of an inertia of the mobile robot. Determining a time at which the mobile robot slows can be indicative of when the robot detects the standing test device. Other information, such as a stopping distance of the mobile robot, and level of deceleration, can be similarly determined from proximity data 800.

Figure 9:
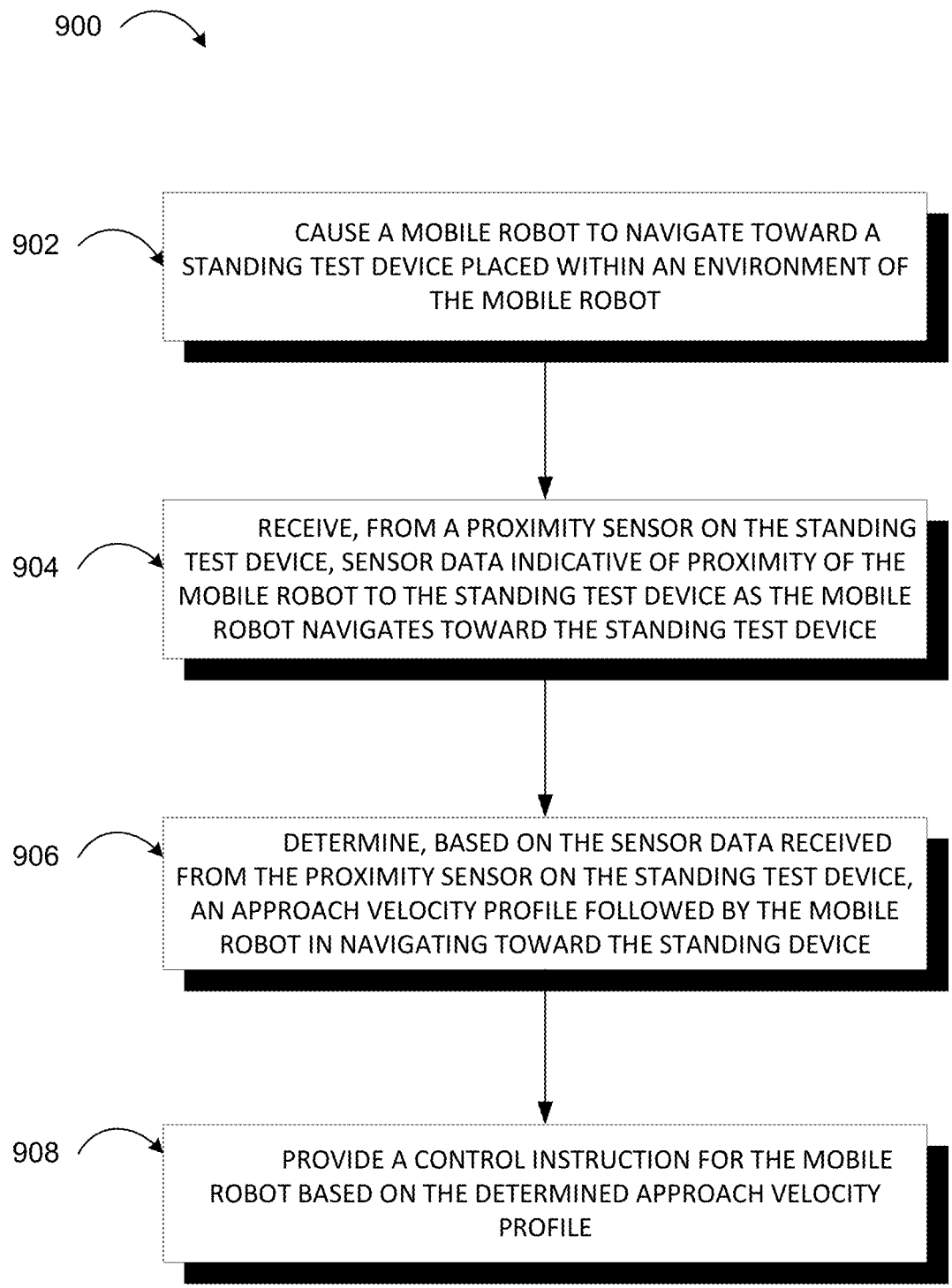
FIG. 9 is a block diagram of a method, in accordance with example embodiments.

FIG. 9 is a block diagram of a method 900, in accordance with example embodiments. In some examples, the method may be carried out as part of a system. For example, blocks 902, 904, 906, and 908 may be carried out by a control system configured to control a mobile robot. In some example embodiments, method 900 can be performed entirely by a remote control system, such as warehouse management system 122 or another central server or servers. In other examples, method 900 can be performed entirely by a control system physically located on the standing test device or on one or more robots. In other examples, the method may be carried out as part of a computing system. In these examples, a non-transitory computer readable medium may store instructions executable by one or more processors to cause the computing system to perform the blocks of the method.

In these examples, the one or more processors and non-transitory computer readable medium may perform the blocks remotely. In other examples, the one or more processors and non-transitory computer readable medium may carry out the method at one or all of the control system, standing test device, and/or the mobile robot. In still other examples, portions of the method may be carried out remotely, while other portions may be carried out at one or all of the control system, standing test device, and/or the mobile robot.

Block 902 of method 900 may be performed to cause a mobile robot to navigate toward a standing test device placed within an environment of the mobile robot. As described, a control system may provide a control instruction that causes the mobile robot to navigate toward the standing test device. In such examples, method 900 may further include periodically sending, by the control system, sensor testing instructions to each mobile robot of the plurality to navigate towards the standing test device as part of a robot sensor testing procedure, as described above with regard to FIG. 5. In other examples, the mobile robot may navigate toward the standing test device automatically. In still other examples, the standing test device may cause the mobile robot to navigate toward the standing test device.

Block 904 of method 900 may be performed to receive, from a proximity sensor on the standing test device, sensor data indicative of proximity of the mobile robot to the standing test device as the mobile robot navigates toward the standing test device. For example, a control system can receive from a transmitter of the standing test device, a signal that carries proximity data. In other examples, block 904 can be carried out by one or more processors of the standing test device.

Block 906 of method 900 may be performed to determine, based on the sensor data received from the proximity sensor on the standing test device, an approach motion profile followed by the mobile robot in navigating toward the standing device. As described above with regard to FIG. 8, proximity data indicative of a plurality of distances between the mobile robot and the standing test device can be used to determine an approach motion profile that can be used to evaluate performance of the mobile robot. Determining the approach motion profile can include determining a plurality of velocities of the mobile robot relative to the standing test device based on a plurality of distances between the mobile robot and the standing test device indicated by the proximity sensor and a plurality of timestamps that correspond to the plurality of distances. Block 906 can be carried out by the control system or by the standing test device.

Block 908 of method 900 may be performed to provide a control instruction for the mobile robot based on the determined approach motion profile.

Method 900 may further include determining, by the standing test device, a mobile robot identifier, wherein the control instruction is provided to the mobile robot based on the determined mobile robot identifier. For example, the standing test device may receive the mobile robot identifier and associate the mobile robot identifier with the proximity data. The control system may receive the mobile robot identifier along with the proximity data, and may control the mobile robot based on the received mobile robot identifier and the proximity data.

Method 900 may further include determining, based on the sensor data, a distance from the standing test device at which the mobile robot stopped, where the control instruction is based on whether the distance is within a threshold distance of the standing test device. The control instruction provided to the mobile robot can cause the mobile robot to continue navigating within the environment based on a determination that the mobile robot stopped outside the threshold distance of the standing test device, or can cause the mobile robot to await manual control based on a determination that the mobile robot stopped within the threshold distance of the standing test device.

Method 900 may further include prior to causing the mobile robot to navigate toward the standing test device, causing the standing test device to navigate to a predetermined location within the environment, such as testing zone 506 described above with regard to FIG. 5.

Method 900 may further include determining, a detection time at which the mobile robot detects the standing test device and determining, from the approach motion profile, a detection distance between the mobile robot and the standing test device at the detection time. Providing the control instruction may be based at least on the determined detection distance. Method 900 may further include determining, from the approach motion profile, a velocity of the mobile robot at the detection time, and determining, from the approach motion profile, a stopping distance of the mobile robot associated with the determined velocity. Providing the control instruction may be based at least on the determined stopping distance of the mobile robot. Method 900 may further include determining, from the approach motion profile, a level of deceleration of the mobile robot after the detection time. Providing the control instruction may be based at least on the determined level of deceleration.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
  causing a mobile robot to navigate toward a standing test device placed within an environment of the mobile robot;
  receiving, from a proximity sensor on the standing test device, sensor data indicative of proximity of the mobile robot to the standing test device as the mobile robot navigates toward the standing test device;
  determining, based on the sensor data received from the proximity sensor on the standing test device, an approach motion profile followed by the mobile robot in navigating toward the standing device; and
  providing a control instruction for the mobile robot based on the determined approach motion profile.

2. The method of claim 1, wherein causing the mobile robot to navigate toward the standing test device is performed by a control system configured to control a plurality of mobile robots, the method further comprising:

periodically sending, by the control system, sensor testing instructions to each mobile robot of the plurality to navigate toward the standing test device as part of a robot sensor testing procedure.

3. The method of claim 1, wherein determining the approach motion profile comprises determining a plurality of velocities of the mobile robot relative to the standing test device based on a plurality of distances between the mobile robot and the standing test device indicated by the proximity sensor and a plurality of timestamps that correspond to the plurality of distances.

4. The method of claim 1, further comprising determining, by the standing test device, a mobile robot identifier, wherein the control instruction is provided to the mobile robot based on the determined mobile robot identifier.

5. The method of claim 1, further comprising:
determining, based on the sensor data, a distance from the standing test device at which the mobile robot stopped, wherein the control instruction is based on whether the distance is within a threshold distance of the standing test device.

6. The method of claim 5, wherein the control instruction provided to the mobile robot causes the mobile robot to continue navigating within the environment based on a determination that the mobile robot stopped outside the threshold distance of the standing test device.

7. The method of claim 5, wherein the control instruction provided to the mobile robot causes the mobile robot to await manual control based on a determination that the mobile robot stopped within the threshold distance of the standing test device.

8. The method of claim 1, further comprising, prior to causing the mobile robot to navigate toward the standing test device, causing the standing test device to navigate to a predetermined location within the environment.

9. The method of claim 1, further comprising:
determining, a detection time at which the mobile robot detects the standing test device; and
determining, from the approach motion profile, a detection distance between the mobile robot and the standing test device at the detection time;
wherein providing the control instruction is based at least on the determined detection distance.

10. The method of claim 1, further comprising:
determining, a detection time at which the mobile robot detects the standing test device;
determining, from the approach motion profile, a velocity of the mobile robot at the detection time;
determining, from the approach motion profile, a stopping distance of the mobile robot associated with the determined velocity; and
wherein providing a control instruction is based at least on the determined stopping distance of the mobile robot.

11. The method of claim 1, further comprising:
determining, a detection time at which the mobile robot detects the standing test device; and
determining, from the approach motion profile, a level of deceleration of the mobile robot after the detection time;
wherein providing the control instruction is based at least on the determined level of deceleration.

12. A system comprising:
a freestanding housing;
a proximity sensor disposed on the housing;
one or more processors;
a non-transitory computer-readable medium; and
program instructions stored on the non-transitory computer readable medium and executable by the one or more processors to:
receive an identifier for a mobile robot from a control system that has instructed the mobile robot to navigate toward the standing test device as part of a robot sensor testing procedure;
identify the mobile robot as the mobile robot approaches the housing;
determine, from the proximity sensor, proximity data comprising a plurality of distances between the housing and the mobile robot;
associate the proximity data with the identifier; and
send data representative of the proximity data and the identifier to the control system.

13. The system of claim 12, wherein the housing has a diameter greater than 70 millimeters (mm) and less than 200 mm, and wherein the housing has a height greater than 400 mm.

14. The system of claim 12, wherein the housing has a convex bottom portion configured to roll on a floor surface, and wherein the housing has a center of gravity that falls within a bottom half of the housing such that the freestanding housing is freely movable upon an application of force to the housing, and such that the housing returns to a vertical orientation after the application of force.

15. The system of claim 12, wherein the program instructions are further executable to navigate the housing to a predetermined location prior to identifying the mobile robot.

16. The system of claim 12, further comprising an image capture device disposed within the housing, wherein the program instructions are executable to identify the mobile robot based on an image captured by the image capture device.

17. The system of claim 12, further comprising a transceiver, wherein the program instructions are executable to identify the robot based on a signal received from the mobile robot.

18. The system of claim 12, further comprising an impact sensor disposed within the housing, wherein the impact sensor is configured to determine a force of impact between a mobile robot and the housing.

19. The system of claim 12, further comprising:
the control system; and
a plurality of mobile robots;
wherein the control system is configured to periodically send sensor testing instructions to each mobile robot of the plurality to navigate toward the housing as part of a robot sensor testing procedure.

20. A non-transitory computer readable medium having stored therein instructions executable by one or more processors to cause a computing system to perform functions comprising:
causing a mobile robot to navigate toward a standing test device placed within an environment of the mobile robot;
receiving, from a proximity sensor on the standing test device, sensor data indicative of proximity of the mobile robot to the standing test device as the mobile robot navigates toward the standing test device;
determining, based on the sensor data received from the proximity sensor on the standing test device, an approach motion profile followed by the mobile robot in navigating toward the standing device; and providing a control instruction for the mobile robot based on the determined approach motion profile.

\* \* \* \* \*